US012810119B1

(12) United States Patent
Townsend et al.

(10) Patent No.: US 12,810,119 B1
(45) Date of Patent: Nov. 24, 2026

(54) ELECTRONIC DEVICE FOR EXTRACTING RELATIONSHIP FEATURES IN A DATA TABLE

(71) Applicant: INDICO DATA SOLUTIONS Inc., Boston, MA (US)

(72) Inventors: Benjamin Townsend, Plymouth (GB); Madison May, Asheville, NC (US); Christopher Wells, Kennett Square, PA (US)

(73) Assignee: INDICO DATA SOLUTIONS Inc., Boston, MA (US)

( * ) Notice: Subject to any disclaimer, the term of this patent is extended or adjusted under 35 U.S.C. 154(b) by 413 days.

(21) Appl. No.: 18/611,571

(22) Filed: Mar. 20, 2024

(51) Int. Cl.
*G06F 7/00* (2006.01)
*G06F 16/00* (2019.01)
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
None
See application file for complete search history.

(56) References Cited

U.S. PATENT DOCUMENTS 11,748,577 B1 9/2023 Aberle
11,893,012 B1 2/2024 Appalaraju et al.
11,893,503 B2 2/2024 Misra et al.

OTHER PUBLICATIONS

Deng, et al., "TURL: Table Understanding through Representation Learning," arXiv:2006.14806v2 [cs.IR], Dec. 3, 2020 (14 pages).
Eisenschlos, et al."MATE: Multi-view Attention for Table Transformer Efficiency," arXiv:2109.04312v1 [cs. CL], Sep. 9, 2021 (14 pages).
Herzig, et al. "TAPAS: Weakly Supervised Table Parsing via Pre-training," arXiv:2004.02349v2 [cs.IR], Apr. 21, 2020 (14 pages).
Houlsby, et al., "Parameter-Efficient Transfer Learning for NLP," arXiv:1902.00751v2 [cs.LG] Jun. 13, 2019 (13 pages).
Iida, et al., "TABBIE: Pretrained Representations of Tabular Data", arXiv:2105.02584v1 [cs.CL] May 6, 2021 (11 pages).
Liu, et al. "ROBERTa: A Robustly Optimized BERT Pretraining Approach," arXiv:1907.11692v2 [cs.CL], Jul. 26, 2019 (13 pages).
Vaswani, et al., "Attention is all you need," Published: Jun. 12, 2017 (arxiv.org/pdf/1706.03762.pdf).
Wang, et al., TUTA: Tree-based Transformers for Generally Structured Table, arXiv:2010.12537v4 [cs.IR] Jul. 20, 2021 (11 pages).

*Primary Examiner* — Tuan A Pham
(74) *Attorney, Agent, or Firm* — Ladas & Parry, LLP

(57) ABSTRACT

A transformer device for processing a data table having rows and columns, the device comprising: an embedding layer arranged for embedding the data in the table; a plurality of transformer layers connected in series, each transformer layer comprising: first and second transformers arranged for generating respectively a set of column hidden vectors and a set of row hidden vectors for each column and row of the table; first and second trainable mixing adaptors arranged for adding a weighted version of the row hidden vectors to the column hidden vectors and for adding a weighted version of the column hidden vectors to the row hidden vectors; and in output of the plurality of transformer layers connected in series, first and second output transformers arranged for generating respectively sets of output column and row attention vectors for each column and row of the table.

11 Claims, 7 Drawing Sheets

ELECTRONIC DEVICE FOR EXTRACTING RELATIONSHIP FEATURES IN A DATA TABLE

TECHNICAL FIELD

This presentation relates to electronic devices implementing transformer models for extracting relationship features from data, in particular electronic devices comprising transformers arranged to extract relationship features from data arranged in tables.

BACKGROUND

Electronic devices implementing transformer "models", or "transformer devices", or "transformers", can be computers programmed to implement transformer models or they can be dedicated hardware built using processors (such as a GPU), neural networks and memory circuits. Processors and memory circuits can be built using CMOS circuits. Neural networks can be built using CMOS neuron circuits or memristive neuron circuits.

FIG. 1 illustrates a transformer device 10 as was first described in the paper "Attention is all you need" by Vaswani et Al, Published: 2017 Jun. 12 (arxiv.org/pdf/1706.03762.pdf), which is hereby incorporated by reference in its entirety. Transformer models advantageously replace previous models, which can only process data sequentially. As shown in FIG. 1, transformer model 10 comprises an encoder stack 12 and a decoder stack 14.

Encoder stack 12 comprises circuits arranged to form an embedding layer 16, receiving the inputs 18 of the encoder and having its output 20 connected in input of circuits arranged to form a positional encoding layer 22. The output 24 of the positional encoding layer 22 is connected in input of circuits arranged to form an encoder block composed of a stack of N identical encoder layers 26 arranged in series, where N is an integer for example equal to 6. Each encoder layer 26 comprises two encoder sub layers 26' and 26". The first encoder sub layer 26' comprises a multi-head self-attention mechanism 28, and the second encoder sub layer 26" comprises a simple, position-wise fully connected feed-forward neural network 30. Each of the encoder sub-layers 26', 26", comprises a residual connection 32', 32", followed by a layer normalization block 34', 34".

Generally speaking, each attention mechanism can be described as a mechanism implementing a mapping of a "Query" data and a set of "Key-Value" pairs of data to an output data, where the "Query", "Keys", "Values" and "Outputs" are all sets of data that can be described as vectors in a multi-dimensional space. Essentially, the Outputs of the attention mechanism are calculated as a weighted sum of the Values, where the weights assigned to each Value are computed by a compatibility function of the Query with the Key corresponding to the Value.

In detail, the embedding layer 16 is arranged to receive in input a sequence of tokens 18, where a token can be a word or a portion of a word or a punctuation element, and to generate in return a sequence of as many vectors as there are tokens in the input sequence. In practice, each of the vectors produced by the embedding layer represents a single token of the input sequence in a n-dimensional space, where each dimension of said space can in some instance be seen as an interpretable concept that may relate to the token. For example if the token is the word "bird", a vector generated by the embedding layer for the token may have a non-zero value along dimensions related to the concepts "aeroplane", "animal", "videogame", "pet", "food", "flower", "weight", etc. that have been associated semantically to the word "bird" in the training data but will have zero values along dimensions related to other concepts (like "brick" or "submarine") never associated semantically to the word "bird" in the training data. However, generally speaking, most dimensions of the n-dimensional space do not relate to clearly interpretable concepts. They are just a dimension in which various input tokens are given a position as a function of the value of the token. The position encoding layer 22 is arranged to add to each vector component a different position value that depends on the position of the token in the sequence.

Each multi-head attention mechanism 28 comprises a plurality of structurally identical simple attention mechanisms arranged in parallel. Each simple attention mechanism receives in input a sequence of vectors corresponding each to a token of the sequence of tokens 18. The simple attention mechanism calculates similarity values representing a relative importance of each input vector (said input vector being previously changed into a "Query" vector) with respect to all of the input vectors (each input vector being previously changed into a "Key" vector). Each input vector (being previously changed into a "Value" vector) is then weighted by the similarity values obtained for said input vector (as a "Key", relative to the "Query"); and the weighted vectors are added together to generate a "self attention values" vector for the input vector corresponding to the Query. A self attention values vector is thus calculated for each received input vector/Query by each simple attention mechanism 28. Importantly, the self attention values vectors calculated for each received input vector can be calculated in parallel. It is to be noted that the Query, Key, and Value vectors calculated for an input vector of the simple attention mechanism are each a different projection of said input vector in a multi-dimensional space, respectively using a dot-product by three different trainable weighting matrixes. Each simple attention mechanism of a multi-head attention mechanism 28 uses a different trio of weighting matrixes. The self attention values vectors calculated for an input vector received by each simple attention mechanism are summed together to produce a single self attention values vector that forms the output of the multi-head attention mechanism 28 in response to the input vector. The number of simple attention mechanisms arranged in parallel in a multi-head attention mechanism 28 can be 8.

Residual connection 32' is arranged to add each input vector to its corresponding self attention values vector, and the resulting vector is normalized by circuits arranged to form a layer normalization block 34'. Because the vectors generated by the multi-head attention mechanism 28 are essentially a set of matrix multiplications and thus represent linear transformations, circuits arranged to form a feed forward neural network 30 are arranged to receive the output of normalization block 34' so as to introduce some non-linear transformations, thus allowing the transformer to approximate complex functions. Neural network 30 can be a fully-connected trainable feedforward neural networks using ReLU activation functions for each input, having some shared parameters. Consistently with the architecture of encoder sub-layer 26', in encoder sub-layer 26" a residual connection 32" is arranged to add each input vector to its corresponding output vector from neural network 30, and the resulting vector is normalized in circuits arranged to form a layer normalization block 34".

Decoder stack 14 comprises circuits arranged to form an embedding layer 36 receiving in input a sequence of tokens 38 (i.e. the "outputs" to be fed to the decoder to correspond to the input tokens fed to the encoder) and having its output 40 connected in input of circuits arranged to form a positional encoding layer 42. The output 44 of the positional encoding layer 42 is connected in input of circuits arranged to form a decoder block composed of a stack of N identical decoder layers 46. Each decoder layer 46 comprises three decoder sub layers 46', 46" and 46" connected in series. Consistently with the encoder sub-layers, each of the three decoder sub-layers 46', 46" and 46'" comprises a residual connection 54', 54", 54'" followed by a layer normalization block 56', 56" and 56'".

Embedding layer 36 has a same structure and operation as embedding layer 16, It receives in input a sequence of "output" tokens and generates in return a sequence of as many vectors as there are tokens in the input sequence. Positional encoding layer 42 has a same structure and operation as positional encoding layer 22 and it adds to each received vector unique weightings indicative of the position of the vector's token in the input sequence. First decoder sub layer 46' has a same structure and operation as first encoder sub-layer 26', except that it is modified to: a/prevent positions from attending subsequent positions; and b/receive embedding vectors offset by one position, to ensure that the predictions for a position in the input sequence can only depend on the known outputs at lower positions in the sequence. Second decoder sub layer 46" has a same structure and operation as first encoder sub-layer 26', but it is connected to generate its Query vectors from the output of encoder stack 12 and its Key and Value vectors from the output of first decoder sub-layer 46". The third decoder sub-layer 46'" comprises a simple, position-wise fully connected feed-forward network 50 and it has the same structure and operation as the second encoder sub-layer 26" of the encoder.

As outlined above, a major advantage of transformer device 10 (whether in the form of a dedicated circuit or as a programmed computer) is that it allows processing input data in parallel rather than sequentially. The token context window, or maximum number of input tokens, or maximum sequence length T, that can be processed in parallel depends on the computation power of the transformer. Transformers having a maximum sequence length T of 512 are known. Transformers are thus capable of processing data much more rapidly than devices using previously known sequential models. A method of training a T=512 attention transformer is for example detailed in the paper entitled "ROBERTa: A Robustly Optimized BERT Pretraining Approach" by Yinhan L I U et Al (arXiv: 1907.11692), which is hereby incorporated by reference in its entirety.

Because transformers (or transformers-with-attention", as they are sometimes named in literature) are capable of capturing relationship information between the tokens of a sequence of up to 512 tokens, and because most sentences in human language comprise less than 512 tokens, transformers have proven particularly well suited to process natural human language. However, a problem arose when trying to use a transformer to capture relationship information between tokens or data arranged in a table having rows and columns. For example, tables may not have a natural, serial order as language sentences have. Also, many existing tables exceed 512 tokens, and there is presently a need for an electronic device capable of capturing relationship information between data between data arranged in a table having rows and columns of cells, each cell comprised of one or more tokens, arranged along, in particular when the number of rows multiplied by the number of columns of the table is larger than the token context window of the available transformers.

FIG. 2 illustrates a known model of a table embedding model for an electronic device 70 capable of capturing relationship information between data arranged in a table having rows and columns, in particular when the number of rows multiplied by the number of columns is large. Such a table embedding model is described in the paper "*TABBIE: Pretrained Representations of Tabular Data*", by Hiroshi IIDA et al. (arXiv: 2105.02584 [cs.CL]). The Tabbie model is arranged to predict whether or not each cell in a table is real or corrupted.

Device 70 receives a data table 72 having m×n cells arranged in m rows and n columns in input of an embedding layer 74 that produces embeddings $x_{ij}$ for each cell (where i and j are row and column indices, respectively), as well as embeddings for individual columns $c_j$ and rows $r_i$. A cell can comprise a plurality of tokens.

A row and column transformer 76 comprised of N transformer layers 78 connected in series is arranged in output of embedding layer 74. Each transformer layer 78 comprises a row transformer 80 and a column transformer 82, which can each have the same structure as an encoder 26 such as detailed in relation with FIG. 1. Each transformer layer 78 further comprises an aggregation block 84 that receives in input the outputs of both the row transformer 80 and the column transformer 82. The output of aggregation block 84 forms the output of transformer layer 78. Row transformer 80 is arranged to receive the cell embeddings $x_{ij}$ presented in input of transformer layer 78. In the first layer 78, assuming that row i of table 72 contains the sequence of cell embeddings $x_{i,1}, x_{i,2}, \ldots, x_{i,n}$, this sequence is passed to row transformer 80 which uses self attention to produce contextualized output representations $r_{i,1}, r_{1,2}, \ldots, r_{i,n}$. Similarly, assuming that column j of table 72 contains the sequence of cell embeddings $x_{j,1}, x_{j,2}, \ldots, x_{j,n}$, this sequence is passed to column transformer 82 which uses self attention to produce contextualized output representations $c_{j,1}, c_{j,2}, \ldots, c_{j,n}$. After running the two transformers over all rows and columns, respectively, each cell (i,j) of table 72 is associated with a row embedding $r_{i,j}$ and a column embedding $c_{i,j}$.

Aggregation block 84 is arranged to calculate a mean of row embedding $r_{i,j}$ and column embedding $c_{i,j}$ for each cell (i,j) of table 72. Thus, a transformer layer 78 of rank l (with l comprised between 1 and N) calculates for each cell (i,j) of table 72 an embedding $x_{i,j}^{l+1}=(r_{i,j}^{l}+c_{i,j}^{l})/2$ that is fed to the following transformer layer 78.

The final embeddings $x_{i,j}^{N}$ form the output. Importantly, all of the weighting matrixes of the row and transformer 76 need to be trained for a specific type of data table to be processed by the device 70.

There exists a need for a device for processing data table that requires less training and that requires less calculations to operate.

SUMMARY

Embodiments of this presentation comprise a transformer device for processing a data table having rows and columns, the device comprising an embedding layer arranged for embedding the data in the table; a plurality of transformer layers connected in series, each transformer layer comprising: first and second transformers-with-attention, or "transformers" arranged for generating a set of column hidden vectors and a set of row hidden vectors respectively for each column and row of the table; first and second trainable mixing adaptors arranged for adding a weighted version of the row hidden vectors to the column hidden vectors and for adding a weighted version of the column hidden vectors to the row hidden vectors; and optionally, in output of the plurality of transformer layers connected in series, first and second output transformers arranged for generating sets of output column attention vectors and output row attention vectors, respectively for each column and row of the table.

Embodiments of this presentation comprise a method that include the steps of: a/for each row/column of table, feeding in parallel all embedded tokens of the row/column to a pre-trained row/column transformer and generating a first row/column hidden vector for each token of the row/column; b/generating a first output row/column vector for each token of the row/column with a trainable row/column mixing adaptor receiving the first row & column hidden vector for said token; c/for each row/column of the table, feeding in parallel all first output row/column vector for each token of the row/column to a pre-trained row/column transformer and generating a subsequent row/column hidden vector for each token of the row/column; d/generating a subsequent output row/column vector for each token of the row/column with a trainable row/column mixing adaptor receiving the row & column hidden vector for said token; repeating steps c/and d/a predetermined number of times; e/optionally, for each row/column of table, feeding in parallel to a pre-trained output row/column transformer the subsequent output row/column vector for each token of the row/column from the last implemented step d/, and generating an output row/column attention vector for each token of the row/column; and f/concatenating the output column attention vector and the output row attention vector associated to each token of the table. According to embodiments of this presentation, the pre-trained transformers can be pre-trained on text only, as opposed to being pre-trained on tables.

Embodiments of the presentation comprise an electronic device for extracting features that capture relationship information between data arranged in a table having rows and columns, the device comprising: an embedding layer arranged for associating each data of the table to an embedding vector in a multi-dimensional space; a first transformer layer comprising: a first transformer arranged for, for each column of the table, receiving in parallel all the embedding vectors associated to the data in said column and generating one column hidden vector for each embedding vector, each column hidden vector being associated to the same data as said each embedding vector; and a second transformer arranged for, for each row of the table, receiving in parallel all the embedding vectors associated to the data in said row and generating one row hidden vector for each embedding vector, each row hidden vector being associated to the same data as said each embedding vector; whereby each data of the table is associated to one column hidden vector and one row hidden vector; the first transformer layer further comprising:

a first mixing adaptor arranged for associating an output column vector to each data of the table, said output column vector being a sum of the column hidden vector associated to said each data of the table and of a modified row hidden vector equal to the row hidden vector associated to said each data of the table, weighted by a first set of backpropagation-trainable weights; a second mixing adaptor arranged for associating an output row vector to each data of the table, said output row vector being a sum of the row hidden vector associated to said each data of the table and of a modified column hidden vector equal to the column hidden vector associated to said each data of the table, weighted by a second set of backpropagation-trainable weights; a plurality of transformer layers connected in series with the first transformer layer; each transformer layer of said plurality of transformer layers being identical to the first transformer layer, except that: the first transformer of each transformer layer in series with a previous transformer layer is arranged for receiving in parallel from the previous transformer layer in the series, for each column of the table, the output column vectors associated to the data of said column instead of the embedding vectors associated to said data; and the second transformer of each transformer layer in series with a previous transformer layer is arranged for receiving in parallel from the previous transformer layer in the series, for each row of the table, the output row vectors associated to the data of said row instead of the embedding vectors associated to said data; an output transformer layer comprising: a first output transformer arranged for receiving in parallel from the last transformer layer of the plurality of transformer layers, for each column of the table, the output column vectors associated to the data of said column and for generating an output column attention vector for each of said output column vector, each output column attention vector being associated to the same data as said each output column vector; and a second output transformer arranged for receiving in parallel from the last transformer layer of the plurality of transformer layers, for each row of the table, the output row vectors associated to the data of said row and for generating an output row attention vector for each of said output row vector, each output row attention vector being associated to the same data as said each output row vector; and a concatenation layer arranged for concatenating the output column attention vector and the output row attention vector associated to each data of the table; wherein the pairs of transformers of each transformer layer are distinct.

According to embodiments of this presentation, each of said data in the table is a token, where any given cell of the table, at the intersection of a row and a column of the table, may comprise a plurality of tokens arranged in a known order.

According to embodiments of this presentation, the first and second transformers of at least one transformer layer are pre-trained transformers.

According to embodiments of this presentation, the first and second transformers of at least one transformer layer are structurally identical.

According to embodiments of this presentation, the first and second transformers of at least one transformer layer are multi-head attention transformers.

According to embodiments of this presentation, in at least one transformer layer the first and second transformers are encoder-only transformers.

According to embodiments of this presentation, the transformers are capable of receiving in parallel a predetermined number t of vectors, and the device further comprises, before the embedding layer a cropping layer arranged for: if a column of the table comprises more than t data, replacing said column by a first sub-column comprising the t first data of said column and a number of subsequent sub-columns equal to the INT[(number of data in said column−t)/(t−h)]+1 where h<<t, and where each sub-column sequentially comprises the h first data of said column and the t-h next data of the column not yet comprised in a previous sub-column, wherein the position of the sub-columns in said column is memorized; and if a row of the table comprises more than t data, replacing said row by a first sub row comprising the t first data of said row and a number of subsequent sub rows equal to the INT[(number of data in said row−t)/(t−h)]+1 where h<<t, and where each sub-row sequentially comprises the h first data of said row and up to the t-h next data of the row not yet comprised in a previous sub-row; wherein the position of the sub-rows in said row is memorized.

According to embodiments of this presentation, each of the first and second mixing adaptors of the transformer layers is arranged for generating a weighted d-dimensional output vector generated from a d-dimensional input vector by: projecting the d-dimensional input vector into a smaller dimension s; applying a non-linearity transformation to the s-dimensional projection, wherein said non-linearity transformation is trainable by back-propagation; and generating the output d-dimensional vector by projecting back the transformed s-dimensional projection back to d-dimension. According to embodiments of this presentation, s is smaller than d/2.

Other embodiments of this presentation include a table transformer device, comprising: an embedding layer for embedding each token of a table having rows and columns; a plurality of transformer blocs connected in series; each transformer block comprising: a column transformer arranged to process each embedded token from said table as forming part of a column of said table; a row transformer arranged to process each embedded token from said table as forming part of a row of said table; a column mixing adaptor arranged to bias the output of the column transformer for each token of said table with a trainably weighted output of the row transformer for said token; and a row mixing adaptor arranged to bias the output of the row transformer for each token of said table with a trainably weighted output of the column transformer for said token.

According to embodiments of this presentation, the table transformer device further comprises: an output column transformer arranged to process the output of the column mixing adaptor of the last transformer block of the series of transformer block; an output row transformer arranged to process the output of the row mixing adaptor of the last transformer block of the series of transformer block; and a concatenation layer arranged for concatenating the outputs of the output column and row transformers associated to each token of the table.

According to embodiments of this presentation, the column transformer and the row transformer of each block of the series of transformer blocks are pre-trained.

Other embodiments of this presentation include a non-transient computer readable medium containing program instructions for causing a computer to perform the method of: a/ receiving tokens arranged in a table having rows and columns and embedding each token; b/ processing each embedded token from said table as forming part of a column of said table using a first transformer and processing each embedded token from said table as forming part of a row of said table using a second transformer; c/ generating first outputs by adding to an output of the first transformer for each token of said table an output of the second transformer for said token, weighted by a first set of trainable weights; and generating second outputs by adding to an output of the second transformer for each token of said table an output of the first transformer for said token, weighted by a second set of a trainable weights; and d/ repeating steps b/ and c/ a plurality of times, replacing in step b/ the embedded tokens from the table as parts of rows and columns of the table by the first and second outputs generated by the previous step c/.

According to embodiments of this presentation, the program instructions are further arranged for causing a computer to perform the additional method steps of: e/ processing the first outputs generated by the last step c/ with a first output transformer and processing the second outputs generated by the last step c/ with a second output transformer; and f/ concatenating the outputs of the output column and row transformers associated to each token of the table.

According to embodiments of this presentation, the first and second transformers of each step b/ are pre-trained and are different for each step b/.

According to embodiments of this presentation, the first and second transformers of each step b/ are multi-head attention transformers.

According to embodiments of this presentation, the first and second transformers of each step b/ are encoder-only transformers.

According to embodiments of this presentation, the transformers of step b/are capable of receiving in parallel a predetermined number t of vectors, and wherein the method further comprises, before embedding the tokens, using a cropping layer arranged for: if a column of the table comprises more than t tokens, replacing said column by a first sub-column comprising the t first tokens of said column and a number of subsequent sub-columns equal to the INT [(number of tokens in said column−t)/(t−h)]+1 where h<<t, and where each sub-column sequentially comprises the h first tokens of said column and the t-h next tokens of the column not yet comprised in a previous sub-column, wherein the position of the sub-columns in said column is memorized; and if a row of the table comprises more than t tokens, replacing said row by a first sub row comprising the t first tokens of said row and a number of subsequent sub rows equal to the INT[(number of tokens in said row−t)/(t−h)]+1 where h<<t, and where each sub-row sequentially comprises the h first tokens of said row and up to the t-h next tokens of the row not yet comprised in a previous sub-row; wherein the position of the sub-rows in said row is memorized.

Other embodiments of this presentation include a method for extracting features that capture relationship information between data arranged in a table having rows and columns, the method comprising: using an embedding layer arranged to associate each data of the table to an embedding vector in a multi-dimensional space; using a first transformer layer comprising: a first transformer arranged for, for each column of the table, receiving in parallel all the embedding vectors associated to the data in said column and generating one column hidden vector for each embedding vector, each column hidden vector being associated to the same data as said each embedding vector; and a second transformer arranged for, for each row of the table, receiving in parallel all the embedding vectors associated to the data in said row and generating one row hidden vector for each embedding vector, each row hidden vector being associated to the same data as said each embedding vector; whereby each data of the table is associated to one column hidden vector and one row hidden vector; the first transformer layer further comprising: a first mixing adaptor arranged for associating an output column vector to each data of the table, said output column vector being a sum of the column hidden vector associated to said each data of the table and of a modified row hidden vector equal to the row hidden vector associated to said each data of the table, weighted by a first set of backpropagation-trainable weights; a second mixing adaptor arranged for associating an output row vector to each data of the table, said output row vector being a sum of the row hidden vector associated to said each data of the table and of a modified column hidden vector equal to the column hidden vector associated to said each data of the table, weighted by a second set of backpropagation-trainable weights; using a plurality of further transformer layers connected in series with the first transformer layer; each further transformer layer of said plurality of further transformer layers being identical to the first transformer layer, except that: the first transformer of each further transformer layer in series with a previous transformer layer is arranged for receiving in parallel, from the previous transformer layer in the series, the output column vector associated to each data of each row of the table instead of the embedding vector associated to said data; and the second transformer of each further transformer layer in series with a previous transformer layer is arranged for receiving in parallel, from the previous transformer layer in the series, the output row vector associated to each data of each row of the table instead of the embedding vector associated to said data; using an output transformer layer comprising: a first output transformer arranged for receiving in parallel, from the last transformer layer of the plurality of transformer layers, the output column vector associated to each data of each column of the table and for generating an output column attention vector for each output column vector, each output column attention vector being associated to the same data as said each output column vector; and a second output transformer arranged for receiving in parallel, from the last transformer layer of the plurality of transformer layers, the output row vector associated to each data of each row of the table and for generating an output row attention vector for each output row vector, each output row attention vector being associated to the same data as said each output row vector; and using a concatenation layer arranged to concatenate the output column attention vector and the output row attention vector associated to each data of the table; wherein the pairs of transformers of each transformer layer are distinct.

According to embodiments of this presentation, each of said data in the table is a token data.

FIGURES

The above features will now be described in more details in relation with the following figures, wherein.

DETAILED DESCRIPTION

The following description is presented to enable one of ordinary skill in the art to make and use the teachings of this presentation and to incorporate them in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of embodiments of this presentation. However, it will be apparent to one skilled in the art that such embodiments may be practiced without necessarily being limited to these specific details.

All the features disclosed in this presentation, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112 (f). In particular, the use of "step of" or "act of" in the claims herein is not intended to invoke the provisions of 35 U.S.C. 112, Paragraph 6.

Figure 3:
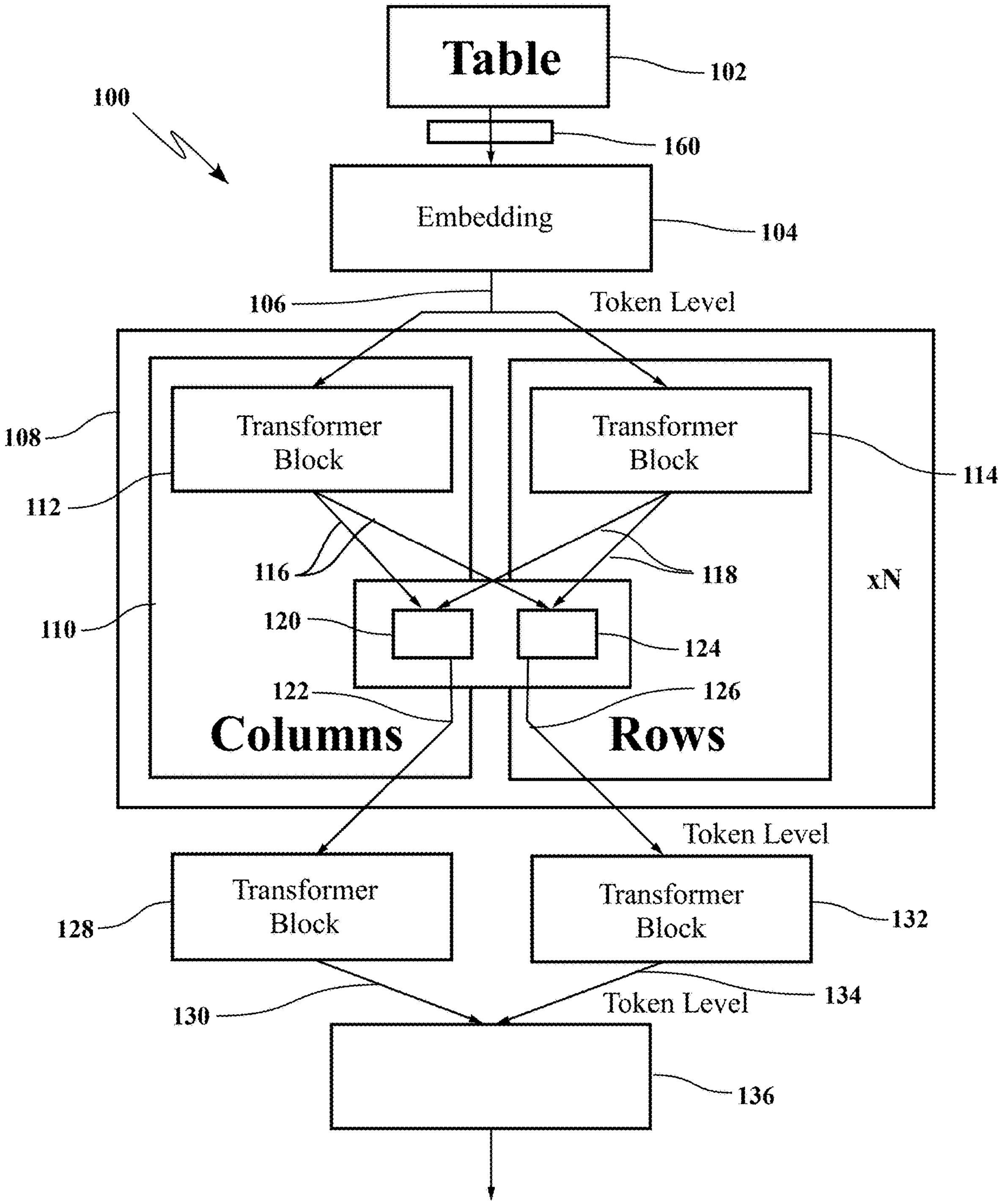
FIG. 3 illustrates an electronic device according to this presentation, which extracts relationship features from data arranged in tables.

FIG. 3 illustrates an electronic device 100 for extracting features that capture relationship information between data arranged in a table 102 having rows and columns. According to embodiments of this presentation, device 100 comprises circuits that form an embedding layer 104 that is arranged for associating each data of the table 102 to an embedding vector in a multi-dimensional space. According to an embodiment of this presentation, each "data" of the table is a token. Embedding layer 104 thus outputs a set of multi-dimensional vectors 106 corresponding each to a token of table 102, where the position of the cell of the table (row, column) where the token is found, as well as the position of the token in the cell, remains known. For example, the original position of each token within the input table can be kept track of using a matrix of positions that aligns with the values that are in the row and column transformers. Such a scheme allows a many-to-one mapping of tokens in the transformers to tokens in the input table, which happens for example when a single header cell is a parent of multiple sub-columns or sub-rows as discussed hereafter.

Device 100 further comprises circuits arranged to form a stack 108 of a number N of transformer layers 110 connected in series. According to embodiments of this presentation, a first transformer layer of stack 108, connected in output of embedding layer 104, comprises a first transformer 112, arranged for receiving in parallel, for each column of table 102, all the vectors of set 106 associated to the tokens in said column, and for processing said vectors to generate a set of column hidden vectors 116. Each column hidden vector of set 116 corresponds to one embedding vector of set 106 and is thus associated to the same token as said embedding vector. According to embodiments of this presentation, the first transformer layer of stack 108 also comprises a second transformer 114, arranged for receiving in parallel, for each row of table 102, all the vectors of set 106 associated to the tokens in said row, and for processing said vectors to generate a set of row hidden vectors 118. Each row hidden vector of set 118 corresponds to one embedding vector of set 106, and is thus associated to the same token as said embedding vector. The sets of column hidden vectors 116 and row hidden vectors 118 thus allow each token of table 102 to be associated to one column hidden vector and one row hidden vector (or more, for example if the token is a header token that gets duplicated, as detailed hereafter).

Figure 1:
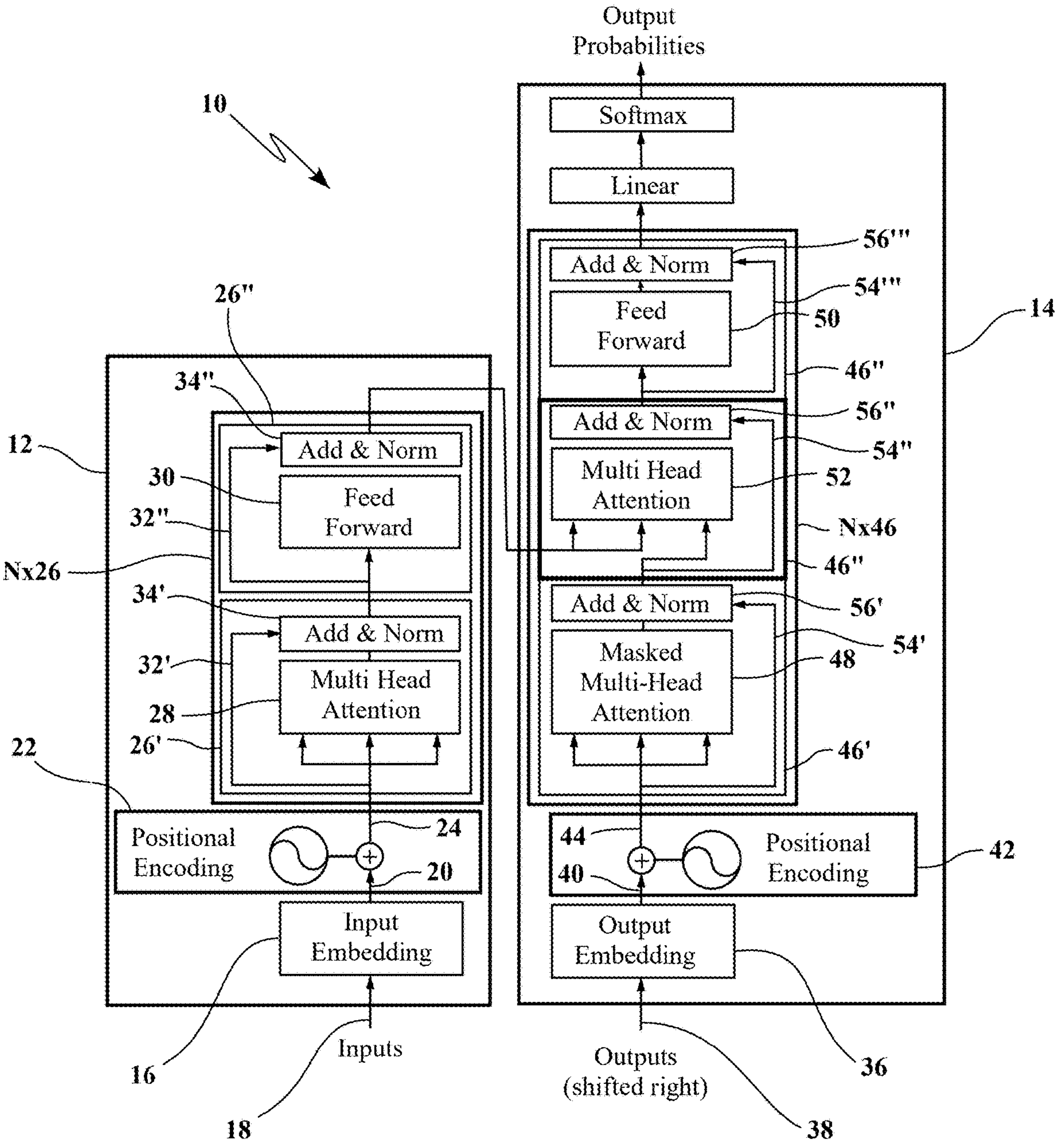
FIG. 1 illustrates a known transformer.

According to embodiments of this presentation, the first and second transformers, 112, 114, can have a same structure as the encoder layer 26 disclosed in relation with FIG. 1. Importantly and as detailed hereafter, the first and second transformers, 112, 114 can be pre-trained for normal text processing, for example for processing a language such as the language used in table 102. Importantly, the first and second transformers, 112, 114, do not require a training with e.g. tables similar to table 102. According to embodiments of this presentation, the first and second transformers 112, 114 can be identical after pre-training.

Figure 2:
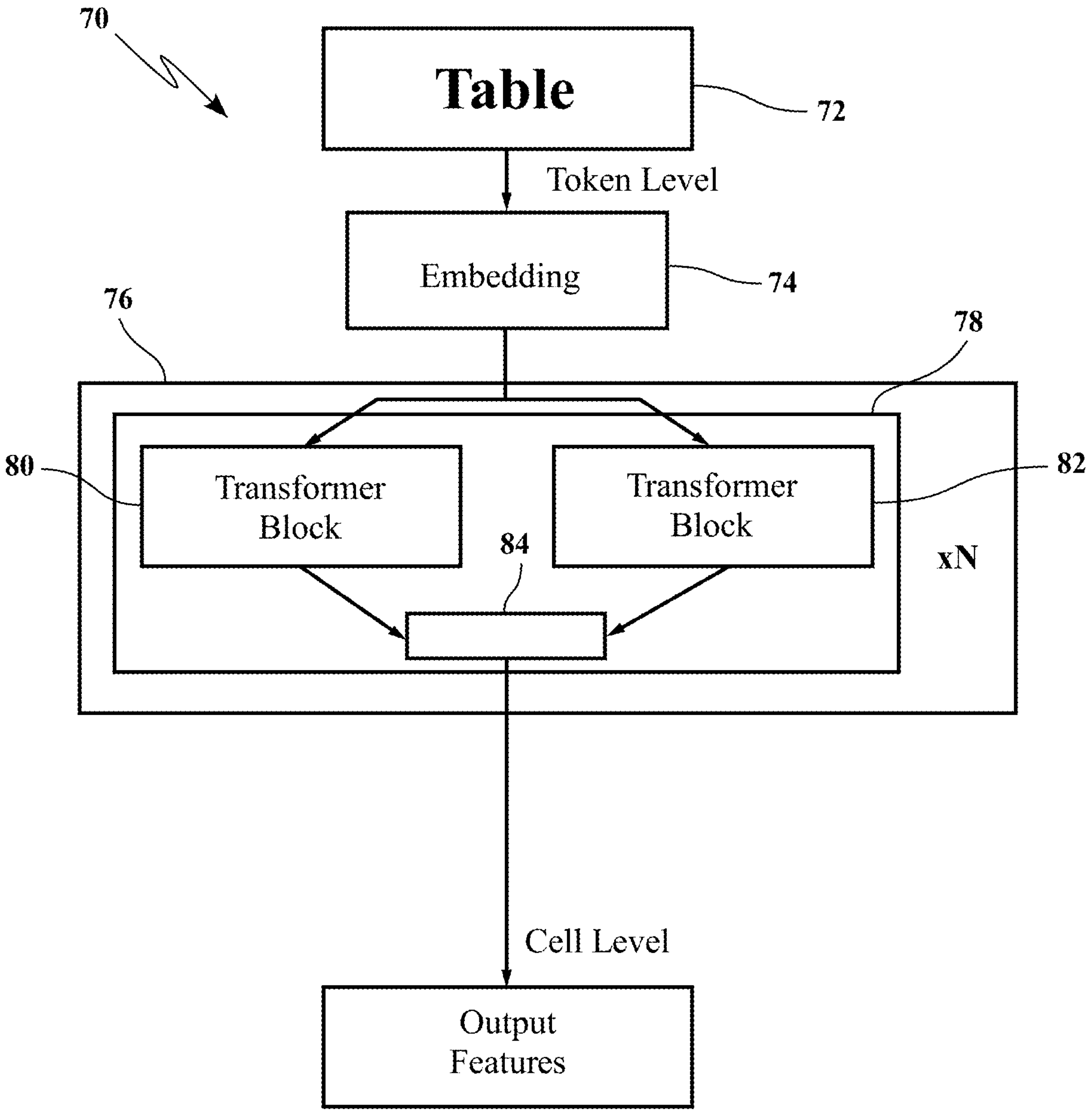
FIG. 2 illustrates a known electronic device comprising transformers arranged to extract relationship features from data arranged in tables.

According to embodiments of this presentation, the first and second transformers, 112, 114 can be minimally trained with tables similar with table 102 after pre-training. A pre-training of a transformer typically requires tens of millions to billions of input data samples. Comparatively, minimally training the transformers arranged according to embodiments of this presentation requires less than a million input data samples, generally in the order of a few hundred thousand input data samples. The combination of elements (transformers, adaptors) of a device according to this presentation thus generally allows reducing the necessary training computations by a plurality of orders of magnitude for processing a table with transformers, compared to the device shown in FIG. 2.

According to embodiments of this presentation; the first transformer layer further comprises circuits that form a first mixing adaptor 120 that is arranged for generating a set of output column vectors 122, where each output column vector of the set 122 is associated to one token of table 102, and where said each output column vector is a sum of: a/the column hidden vector from set 116 associated to said token and b/a modified row hidden vector that is equal to the row hidden vector from set 118 that is associated to said token, weighted by a first set of backpropagation-trainable weights. According to embodiments of this presentation; the first transformer layer further comprises circuits that form a second mixing adaptor 124 that is arranged for generating a set of output row vectors 126, where each output row vector of the set 126 is associated to one token of table 102, and where said each output row vector is a sum of: a/the row hidden vector from set 118 associated to said token and b/a modified column hidden vector that is equal to the column hidden vector from set 116 that is associated to said token, weighted by a second set of backpropagation-trainable weights. The operation of an adaptor is detailed further thereafter.

According to embodiments of this presentation, the further transformer layers 110 of the stack 108 are each identical in structure to the first transformer layer, except that the first transformer 112 of each transformer layer 110 in series with a previous transformer layer 110 is arranged for receiving in parallel from said previous transformer layer 110, for each column of the table, the output column vectors from vector set 122 that are associated to each token of said column instead of the embedding vectors associated to said tokens. According to embodiments of this presentation, the weights used by the transformers in the further transformer layers are different in each layer. Also, the second transformer 114 of each transformer layer 110 in series with a previous transformer layer 110 is arranged for receiving in parallel from said previous transformer layer 110, for each row of the table, the output row vectors from vector set 126 that are associated to each token of said row instead of the embedding vectors associated to said tokens. According to embodiments of this presentation, the weights used by the transformers in the further transformer layers are different in each layer.

According to embodiments of this presentation, optionally, device 100 further comprises a first output transformer 128 arranged for receiving in parallel from the last transformer layer 110 of the stack 108, for each column of the table, the output column vectors 122 associated to the tokens of said column and for generating a set of output column attention vectors 130, each token of said column thus having an associated output column attention vector in the set of output column attention vectors 130. According to embodiments of this presentation, device 100 optionally further comprises a second output transformer 132 arranged for receiving in parallel from the last transformer layer 110 of the stack 108, for each row of the table, the output row vectors 126 associated to the tokens of said row and for generating a set of output row attention vectors 134, each token of said row thus having an associated output row attention vector in the set of output row attention vectors 134. According to embodiments of this presentation, the first and second output transformers 128, 132 can each have a same structure as the first and second transformers, 112, 114, and they can also both be pre-trained transformers (i.e. that need no subsequent training or minimal training, as detailed hereabove).

According to embodiments of this presentation, device 100 further comprises circuits arranged to form a concatenation layer 136 arranged for concatenating the output column attention vector and the output row attention vector associated to each token of the table by the last transformers before layer 136.

Figure 4:
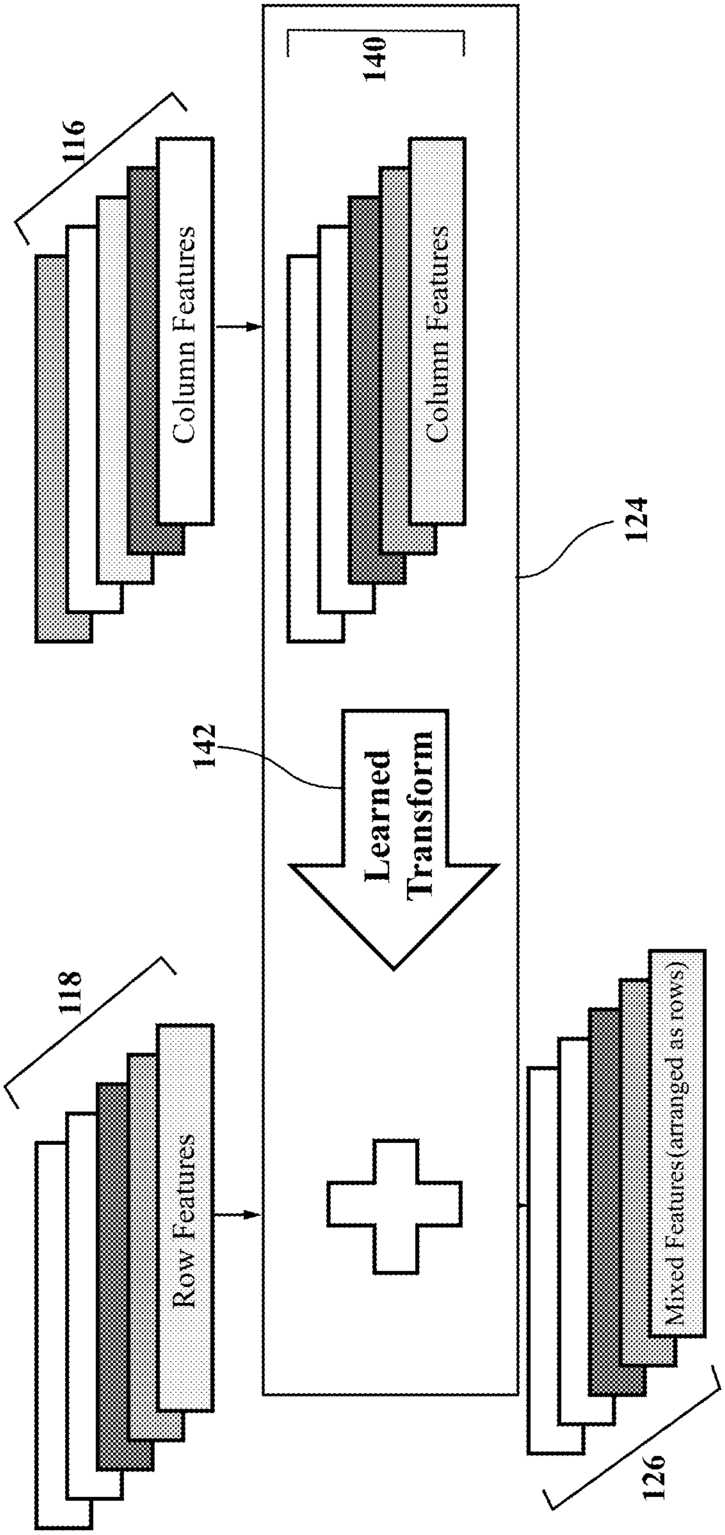
FIG. 4 illustrates an exemplary operation of the adaptor of FIG. 3.

FIG. 4 illustrates the operation of an embodiment of mixing adaptor 124 as show in FIG. 3. Mixing adaptor 124 receives in input all the sets of row hidden vectors 118 as well as all the sets of column hidden vectors 116, then rearranges the column hidden vectors received so as to form an internal sequence of column hidden vectors 140, respectively associated to the same table tokens as the received row hidden vectors in each set 118. Each vector of the sequence 140 is then weighted by a learned linear transform 142 that uses a set of backpropagation-trainable weights, and the weighted vector is added to its associated row hidden vector from each set 118 to form a set of output row vectors 126 having one output row vector associated to each token of the row associated to each set of row hidden vectors 118. Mixing adaptor 120 operates consistently with mixing adaptor 124.

Figure 5:
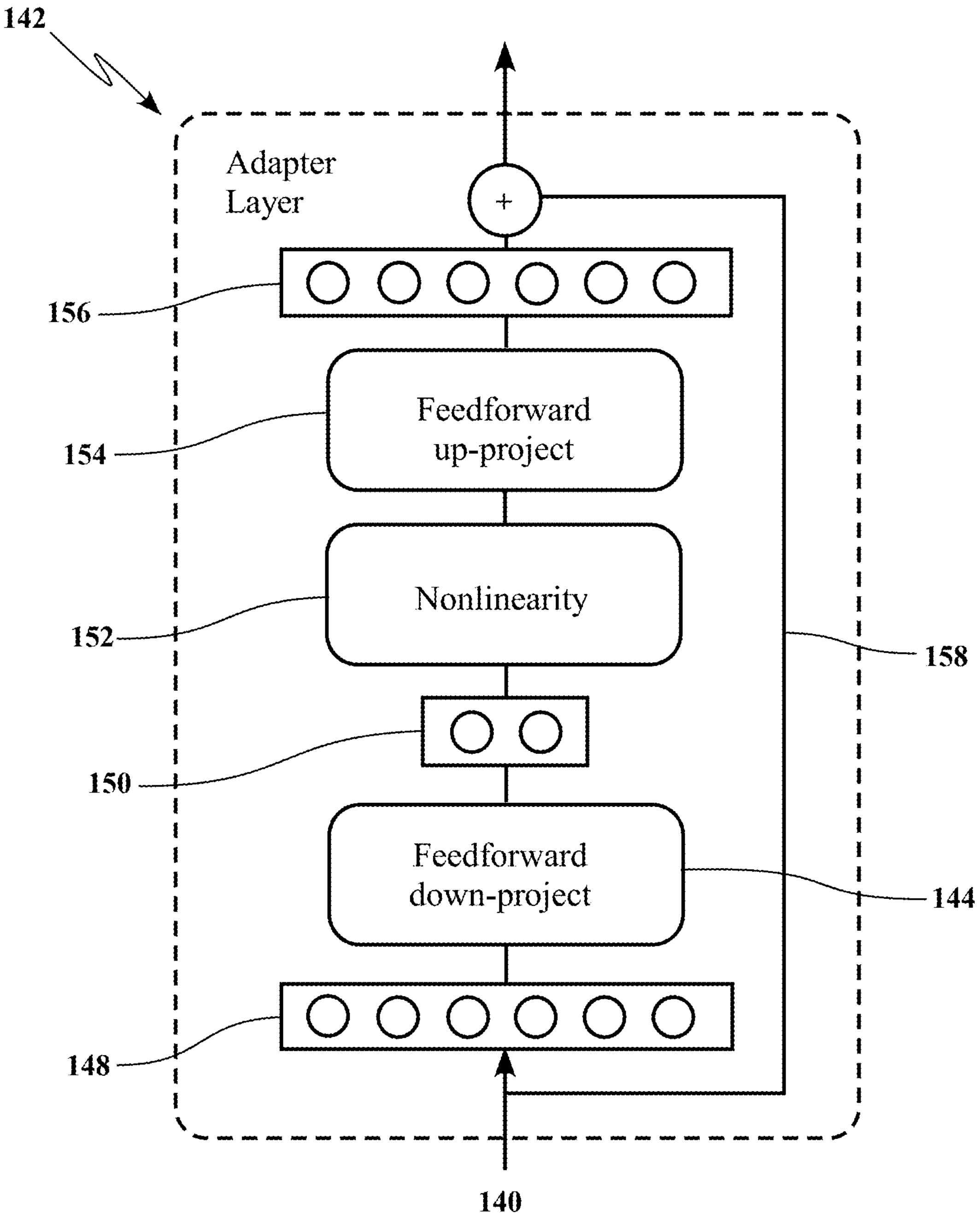
FIG. 5 illustrates an exemplary structure of the learned transform of the adaptor of FIG. 4.

FIG. 5 illustrates an exemplary bottleneck adapter structure for the learned transform block 142 of the adaptor of FIG. 4, arranged for generating a weighted d-dimensional output vector from a d-dimensional input vector by first projecting the d-dimensional input vector into a smaller dimension s; then applying a non-linearity transformation to the s-dimensional projection, wherein said non-linearity transformation is trainable by back-propagation; and finally, generating the output d-dimensional vector by projecting back the transformed s-dimensional projection back to d-dimension. Preferably, s is smaller than d/2. Such a structure is described in detail in the paper entitled "*Parameter-Efficient Transfer Learning for NLP*" by Neil HOULSBY et al (arXiv: 1902.00751 [cs.LG]), which is hereby incorporated by reference in its entirety. Essentially, the transform block consists of a bottleneck which contains only a few parameter relative to the hidden vectors input and output by the adapter.

In detail, transform block 142 comprises a feedforward down-project module 144 arranged to receive in input each vector 148 of the set of vector 140 and to project it on a space having less dimensions than vector 148, thus transforming each vector 148 into a vector 150 having a reduced number of dimensions. Transform block 142 comprises, in output of feedforward down-project module 144, a nonlinearity module 152, followed by a feedforward up-project module 154 that up-converts the nonlinearly transformed vector 150 into an output vector 156 having a same dimension as input vector 148. Transformer block 142 further comprises a skip-connection 158 to add each input vector 148 to its corresponding output vector 156. The feedforward down-project module 144, the nonlinearity module 152 and the feedforward up-project module 154 have near zeros initialization, and during adapter tuning they are each trained on the downstream data fed to the transform block.

Figure 6:
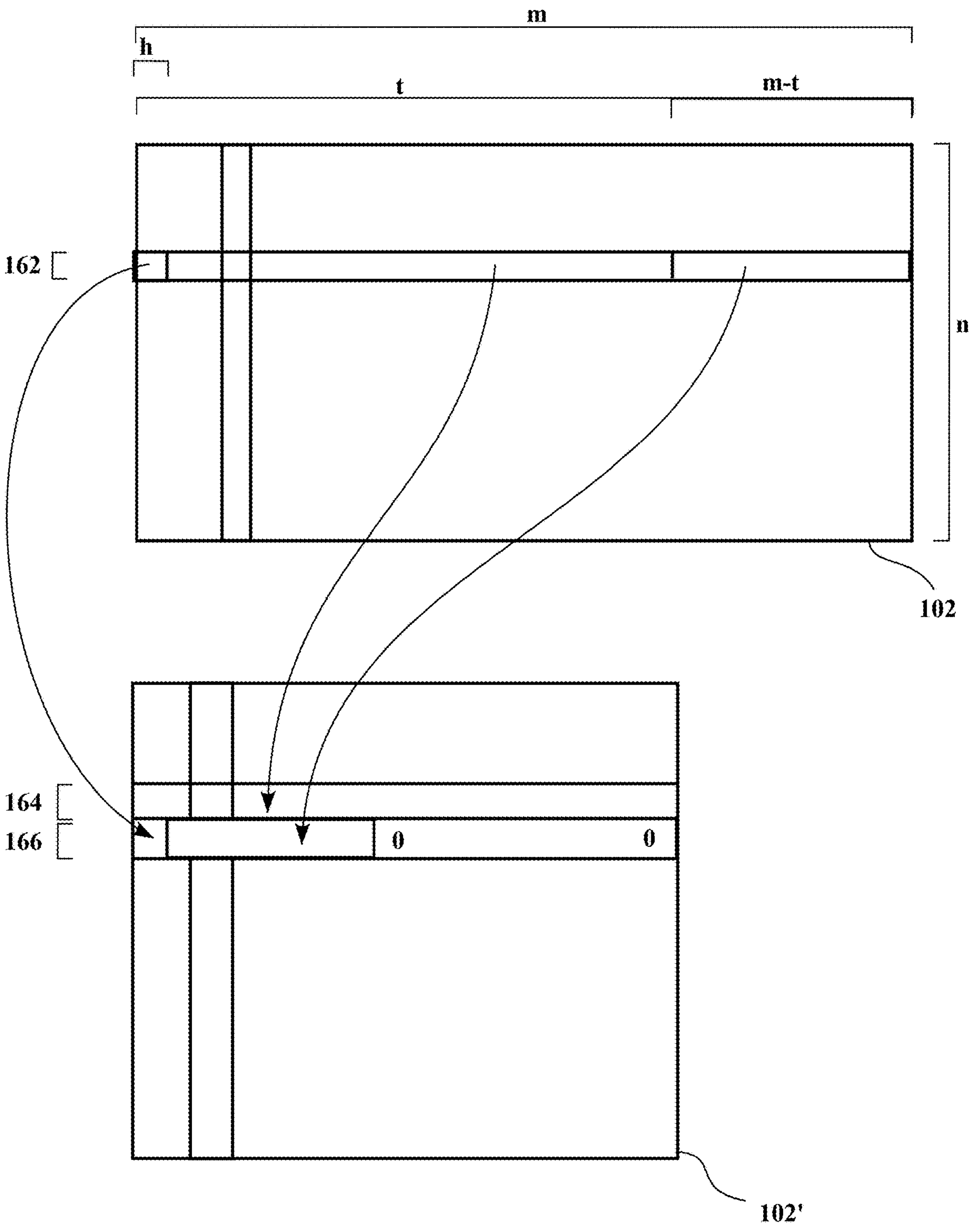
FIG. 6 illustrates a pre-processing of a long row according to this presentation.

FIG. 6 illustrates a pre-processing of a long row according to this presentation. Assuming that the transformers 112, 114, 128, 132 of device 100 have each a token context window of t, embodiments of this presentation provide for handling a table 102 having more than t tokens per row and/or per column. According to embodiments of this presentation, device 10 comprises, for example before the embedding layer a cropping layer 160 arranged for: a/ if a column of table 102 comprises more than t tokens, replacing said column by a first sub-column comprising the t first tokens of said column and a number of subsequent sub-columns equal to the INT[(number of tokens in said column−t)/(t−h)]+1 where h<<t, and where each sub-column sequentially comprises the h first tokens of said column and the t-h next tokens of the column not yet comprised in a previous sub-column, wherein the position of the sub-columns in said column is memorized; and b/if a row of the table comprises more than t tokens, replacing said row by a first sub row comprising the t first tokens of said row and a number of subsequent sub-rows equal to the INT[(number of tokens in said row−t)/(t−h)]+1 where h<<t, and where each sub-row sequentially comprises the h first tokens of said row and up to the t-h next tokens of the row not yet comprised in a previous sub-row; wherein the position of the sub-rows in said row is memorized. The value h can be different when processing the columns and the rows.

FIG. 6 illustrates a table 102 having n>t rows and m>t columns. Table 102 is effectively transformed into a table 102' where each row of table 102 (one row 162 illustrated) is separated into a plurality of sub-rows (two illustrated: 164, 166). Table 102' is for example fed to the embedding layer 104. The first sub-row 164 comprises the t first tokens of the row. Each subsequent sub-row (one illustrated, 166) comprises a number h of the first tokens of the row. The number h can be equal to 2. The inventors have noted that because the first h tokens of a row/column often contain header data pertaining to the whole row/column, it is desirable to have, when a row/column is split into a plurality of sub-rows/sub-columns, the first tokens of the row/column at the beginning of each sub-row/sub column. The position of the sub-rows 154, 166 in row 162 is memorized, for example to allow the operation of mixing adaptors 120, 124. The last sub-row (sub-row 166 in FIG. 6) may comprise t tokens or less.

A technical effect of the above-described combination of a series of blocs comprising each a pair of pre-trained column/row transformers arranged to process separately each embedded token from a table (as respectively forming part of a column and a row of said table), and a pair of trainable mixing adaptors arranged to bias the output of the row transformer for a token with the weighted output of the column transformer for the same token, and to bias the output of the column transformer for a token with the weighted output of the row transformer for the same token, is to allow processing a table having large rows and columns using transformers. Another technical effect of this combination is that it allows minimizing the training of the model/device before it can become operational because only the mixing adaptors require training, and they require training only for a reduced amount of weighting factors. The vectors output by a device according to this presentation can be used to measure “distances” capturing relationship information between two tokens, for example after projecting the vectors on predetermined spaces having a reduced number of dimensions with respect to the device’s output.

According to embodiments of this presentation, and as outlined above, if device 100 does not output for each token vectors that satisfactorily capture relationship information, it remains possible to minimally train the transformers, 112, 114, 128 and 132.

Figure 7:
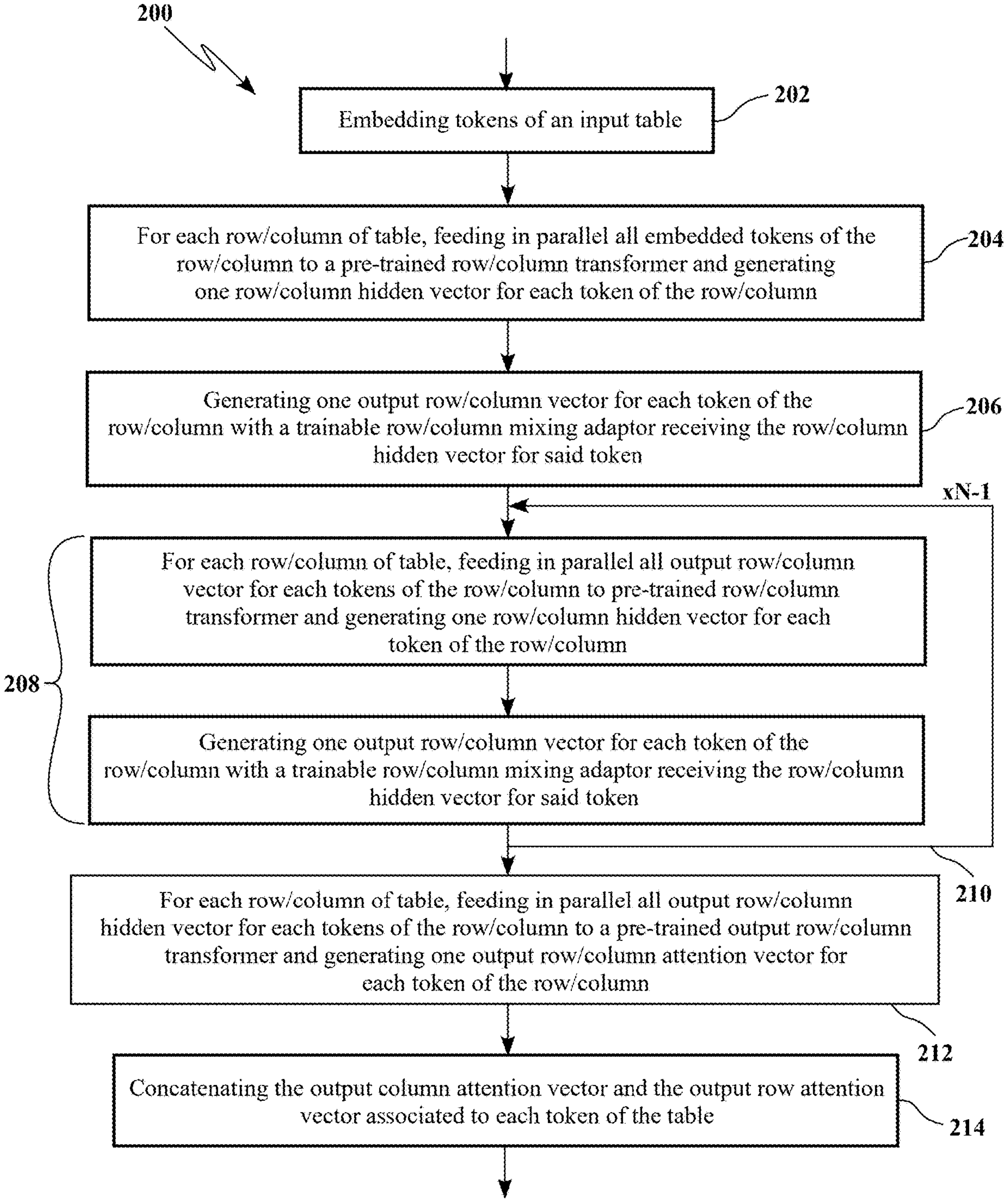
FIG. 7 illustrates a method according to this presentation.

FIG. 7 illustrates a method 200 according to this presentation, comprising the steps of:

a/ receiving tokens arranged in a table having rows and columns, and associating (202) each token of the table to an embedding vector in a multi-dimensional space;

b/ implementing and operating a first transformer layer (204) comprising a first transformer arranged for, for each column of the table, receiving in parallel all the embedding vectors associated to the tokens in said column and generating a first column hidden vector for each embedding vector, each first column hidden vector being associated to the same token as said each embedding vector; and a second transformer arranged for, for each row of the table, receiving in parallel all the embedding vectors associated to the tokens in said row and generating a first row hidden vector for each embedding vector, each first row hidden vector being associated to the same tokens as said each embedding vector; whereby each token of the table is associated to one first column hidden vector and one first row hidden vector;

c/ associating (206) a first output column vector to each token of the table, said first output column vector being a sum of the first column hidden vector associated to said each token of the table and of a modified first row hidden vector equal to the first row hidden vector associated to said each token of the table, weighted by a first set of backpropagation-trainable weights; and associating (206) a first output row vector to each token of the table, said first output row vector being a sum of the first row hidden vector associated to said each token of the table and of a modified first column hidden vector equal to the first column hidden vector associated to said each token of the table, weighted by a second set of backpropagation-trainable weights;

d/ implementing and operating a further transformer layer (208) connected in series with the first transformer layer; each further transformer layer being structurally identical to the first transformer layer, except that: the first transformer of each further transformer layer is arranged for receiving in parallel, from the previous transformer layer, the output column vector associated to each token of each row of the table instead of the embedding vector associated to said token; and the second transformer of each further transformer layer is arranged for receiving in parallel, from the previous transformer layer, the output row vector associated to each token of each row of the table instead of the embedding vector associated to said token. Also, each further transformer layer uses different weights with respect to the first transformer layer;

e/ repeating (210) step d/ a plurality of times, for example between 4 and 10, each time with a transformer layer using different weights;

f/ optionally implementing and operating an output transformer layer (212) comprising: a first output transformer arranged for receiving in parallel, from step d/, the output column vector associated to each token of each column of the table and for generating an output column attention vector for each output column vector, each output column attention vector being associated to the same token as said each output column vector; and a second output transformer arranged for receiving in parallel, from step d/, the output row vector associated to each token of each row of the table and for generating an output row attention vector for each output row vector, each output row attention vector being associated to the same token as said each output row vector (where the output transformer layer also uses different weights with respect to the first transformer layer); and g/ implementing and operating a concatenation layer (214) arranged for concatenating the output column attention vector and the output row attention vector (or the output column vector and the output row vector) associated to each token of the table by the last transformer layer.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112 (f), sixth paragraph, unless the element is expressly recited using the phrase "means for . . . " and no method or process step herein is to be construed under those provisions unless the step, or steps, are expressly recited using the phrase "comprising the step(s) of . . . "

All elements, parts and steps described herein are preferably included. It is to be understood that any of these elements, parts and steps may be replaced by other elements, parts and steps or deleted altogether as will be obvious to those skilled in the art.

What is claimed is:

1. An electronic device for extracting features that capture relationship information between data arranged in a table having rows and columns, the device comprising:

an embedding layer arranged for associating each data of the table to an embedding vector in a multi-dimensional space;

a first transformer layer comprising:

a first transformer arranged for, for each column of the table, receiving in parallel all the embedding vectors associated to the data in said column and generating one column hidden vector for each embedding vector, each column hidden vector being associated to the same data as said each embedding vector; and a second transformer arranged for, for each row of the table, receiving in parallel all the embedding vectors associated to the data in said row and generating one row hidden vector for each embedding vector, each row hidden vector being associated to the same data as said each embedding vector;

whereby each data of the table is associated to one column hidden vector and one row hidden vector; the first transformer layer further comprising:

a first mixing adaptor arranged for associating an output column vector to each data of the table, said output column vector being a sum of the column hidden vector associated to said each data of the table and of a modified row hidden vector equal to the row hidden vector associated to said each data of the table, weighted by a first set of backpropagation-trainable weights;

a second mixing adaptor arranged for associating an output row vector to each data of the table, said output row vector being a sum of the row hidden vector associated to said each data of the table and of a modified column hidden vector equal to the column hidden vector associated to said each data of the table, weighted by a second set of backpropagation-trainable weights;

a plurality of transformer layers connected in series with the first transformer layer;

each transformer layer of said plurality of transformer layers being identical to the first transformer layer, except that:

the first transformer of each transformer layer in series with a previous transformer layer is arranged for receiving in parallel from the previous transformer layer in the series, for each column of the table, the output column vectors associated to the data of said column instead of the embedding vectors associated to said data; and the second transformer of each transformer layer in series with a previous transformer layer is arranged for receiving in parallel from the previous transformer layer in the series, for each row of the table, the output row vectors associated to the data of said row instead of the embedding vectors associated to said data;

an output transformer layer comprising:

a first output transformer arranged for receiving in parallel from the last transformer layer of the plurality of transformer layers, for each column of the table, the output column vectors associated to the data of said column and for generating an output column attention vector for each of said output column vector, each output column attention vector being associated to the same data as said each output column vector; and a second output transformer arranged for receiving in parallel from the last transformer layer of the plurality of transformer layers, for each row of the table, the output row vectors associated to the data of said row and for generating an output row attention vector for each of said output row vector, each output row attention vector being associated to the same data as said each output row vector; and a concatenation layer arranged for concatenating the output column attention vector and the output row attention vector associated to each data of the table;

wherein the pairs of transformers of each transformer layer are distinct.

2. The device of claim 1, wherein each of said data in the table is a token, where any given cell of the table, at the intersection of a row and a column of the table, may comprise a plurality of tokens arranged in a known order.

3. The device of claim 2, wherein in at least one transformer layer the first and second transformers are pre-trained transformers.

4. The device of claim 1, wherein in at least one transformer layer the first and second transformers are structurally identical.

5. The device of claim 1, wherein in at least one transformer layer the first and second transformers are multi-head attention transformers.

6. The device of claim 1, wherein in at least one transformer layer the first and second transformers are encoder-only transformers.

7. The device of claim 1, wherein the transformers are capable of receiving in parallel a predetermined number t of vectors, and wherein the device further comprises, before the embedding layer a cropping layer arranged for:

if a column of the table comprises more than 1 data, replacing said column by a first sub-column comprising the t first data of said column and a number of subsequent sub-columns equal to the INT[(number of data in said column−t)/(t−h)]+1 where h<comprises the h first data of said column and the t-h next data of the column not yet comprised in a previous sub-column, wherein the position of the sub-columns in said column is memorized; and if a row of the table comprises more than t data, replacing said row by a first sub row comprising the t first data of said row and a number of subsequent sub rows equal to the INT[(number of data in said row−t)/(t−h)]+1 where h<<1, and where each sub-row sequentially comprises the h first data of said row and up to the t-h next data of the row not yet comprised in a previous sub-row; wherein the position of the sub-rows in said row is memorized.

8. The device of claim 1, wherein each of the first and second mixing adaptors of the transformer layers is arranged for generating a weighted d-dimensional output vector generated from a d-dimensional input vector by:

projecting the d-dimensional input vector into a smaller dimension s;

applying a non-linearity transformation to the s-dimensional projection, wherein said non-linearity transformation is trainable by back-propagation; and generating the output d-dimensional vector by projecting back the transformed s-dimensional projection back to d-dimension.

9. The device of claim 8, wherein S is smaller than d/2.

10. A method for extracting features that capture relationship information between data arranged in a table having rows and columns, the method comprising:

using an embedding layer arranged to associate each data of the table to an embedding vector in a multi-dimensional space;

using a first transformer layer comprising:

a first transformer arranged for, for each column of the table, receiving in parallel all the embedding vectors associated to the data in said column and generating one column hidden vector for each embedding vector, each column hidden vector being associated to the same data as said each embedding vector; and a second transformer arranged for, for each row of the table, receiving in parallel all the embedding vectors associated to the data in said row and generating one row hidden vector for each embedding vector, each row hidden vector being associated to the same data as said each embedding vector;

whereby each data of the table is associated to one column hidden vector and one row hidden vector;

the first transformer layer further comprising:

a first mixing adaptor arranged for associating an output column vector to each data of the table, said output column vector being a sum of the column hidden vector associated to said each data of the table and of a modified row hidden vector equal to the row hidden vector associated to said each data of the table, weighted by a first set of backpropagation-trainable weights;

a second mixing adaptor arranged for associating an output row vector to each data of the table, said output row vector being a sum of the row hidden vector associated to said each data of the table and of a modified column hidden vector equal to the column hidden vector associated to said each data of the table, weighted by a second set of backpropagation-trainable weights;

using a plurality of further transformer layers connected in series with the first transformer layer;

each further transformer layer of said plurality of further transformer layers being identical to the first transformer layer, except that:

the first transformer of each further transformer layer in series with a previous transformer layer is arranged for receiving in parallel, from the previous transformer layer in the series, the output column vector associated to each data of each row of the table instead of the embedding vector associated to said data; and the second transformer of each further transformer layer in series with a previous transformer layer is arranged for receiving in parallel, from the previous transformer layer in the series, the output row vector associated to each data of each row of the table instead of the embedding vector associated to said data;

using an output transformer layer comprising:

a first output transformer arranged for receiving in parallel, from the last transformer layer of the plurality of transformer layers, the output column vector associated to each data of each column of the table and for generating an output column attention vector for each output column vector, each output column attention vector being associated to the same data as said each output column vector; and a second output transformer arranged for receiving in parallel, from the last transformer layer of the plurality of transformer layers, the output row vector associated to each data of each row of the table and for generating an output row attention vector for each output row vector, each output row attention vector being associated to the same data as said each output row vector; and using a concatenation layer arranged to concatenate the output column attention vector and the output row attention vector associated to each data of the table;

wherein the pairs of transformers of each transformer layer are distinct.

11. The method of claim 10, wherein each of said data in the table is a token data.

* * * * *